United States Patent
Bairley et al.

(10) Patent No.: US 9,518,731 B2
(45) Date of Patent: Dec. 13, 2016

(54) METHOD AND CONFIGURATION TO REDUCE FATIGUE IN STEAM DRUMS

(75) Inventors: Donald W. Bairley, Farmington, CT (US); Wesley P. Bauver, II, Granville, MA (US); Francois Droux, Oberrohrdorf (CH); Alan C. Hazelton, Tolland, CT (US); Ian J. Perrin, North Granby, CT (US); Christoph Ruchti, Uster (CH); Falk Ruecker, Nussbaumen (CH); Glenn T. Selby, Simsbury, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 565 days.

(21) Appl. No.: 13/069,528

(22) Filed: Mar. 23, 2011

(65) Prior Publication Data
US 2012/0240871 A1 Sep. 27, 2012

(51) Int. Cl.
F22B 37/22 (2006.01)
F22B 37/26 (2006.01)

(52) U.S. Cl.
CPC ............. *F22B 37/261* (2013.01); *F22B 37/22* (2013.01)

(58) Field of Classification Search
USPC .............. 122/508, 492, 491, 235.15, 235.31, 301,122/325, 351, 363, 365
See application file for complete search history.

(56) References Cited

U.S. PATENT DOCUMENTS

| | | | |
|---|---|---|---|
| 1,348,179 A * | 8/1920 | Kidwell | 122/297 |
| 1,718,048 A * | 6/1929 | Jacobus | 122/302 |
| 1,880,789 A * | 10/1932 | Carlson | 122/302 |
| 1,887,182 A * | 11/1932 | Coutant | 122/235.31 |
| 2,114,223 A * | 4/1938 | Jacobus | 122/302 |
| 2,289,970 A * | 7/1942 | Rowand et al. | 122/488 |
| 2,414,848 A * | 1/1947 | Badenhausen | 122/365 |
| 4,355,602 A | 10/1982 | Cooke | |
| 4,563,267 A * | 1/1986 | Graham et al. | 208/159 |
| 5,176,110 A * | 1/1993 | Albrecht | 122/6 A |

(Continued)

FOREIGN PATENT DOCUMENTS

| | | |
|---|---|---|
| CN | 201436467 U | 4/2010 |
| DE | 285489 C | 12/1912 |

(Continued)

OTHER PUBLICATIONS

PCT International Search Report and The Written Opinion of the International Searching Authority, dated Dec. 14, 2012 (Dec. 13, 2012) (PCT/US2012/029729).

(Continued)

*Primary Examiner* — Gregory A Wilson
(74) *Attorney, Agent, or Firm* — GE Global Patent Operation; Stephen G. Midgley (57) ABSTRACT

A heat recovery steam generator that includes a first steam drum for receiving a flow of water and steam from an evaporator. The first steam drum is adapted to provide the flow of water and steam to a second steam drum. The second steam drum is in fluid communication with the first steam drum and receives the flow of water and steam from the first steam drum and separates steam from the flow of water and steam to form a separated steam. There is a steam flow outlet positioned in the second steam drum, the steam flow outlet adapted to release the separated steam from the second steam drum.

12 Claims, 4 Drawing Sheets

(56) References Cited

U.S. PATENT DOCUMENTS

| | | | |
|---|---|---|---|
| 5,201,282 A * | 4/1993 | Albrecht | 122/406.1 |
| 5,517,822 A * | 5/1996 | Haws et al. | 60/618 |
| 5,553,571 A | 9/1996 | Campbell et al. | |
| 5,575,244 A | 11/1996 | Dethier | |
| 6,340,002 B1 | 1/2002 | Liebig | |
| 7,168,233 B1 | 1/2007 | Smith et al. | |
| 7,243,618 B2 | 7/2007 | Gurevich | |
| 7,367,192 B2 | 5/2008 | Hattori et al. | |
| 7,509,794 B2 | 3/2009 | Brückner et al. | |
| 2008/0289588 A1 * | 11/2008 | Wees et al. | 122/406.1 |
| 2010/0126433 A1 | 5/2010 | Kozaki | |

FOREIGN PATENT DOCUMENTS

| | | |
|---|---|---|
| EP | 357590 A1 | 3/1990 |
| EP | 1526331 A1 | 4/2005 |
| FR | 678909 A | 4/1930 |
| GB | 526825 | 9/1940 |
| GB | 1207688 A | 10/1970 |
| JP | S53-71701 | 6/1978 |
| JP | 0384301 A | 4/1991 |
| JP | 2002-130606 | 5/2002 |
| JP | 2007-232238 | 9/2007 |
| NL | 53410 | 11/1942 |
| SU | 855338 A1 | 8/1981 |
| SU | 953357 A | 8/1982 |

OTHER PUBLICATIONS

Office action issued from Japanese Patent Office dated Oct. 26, 2015 for JP Application No. 2014-501175.
Decision of Grant issued from Russian Patent Office dated Feb. 5, 2016 for RU Application No. 2013147164.

* cited by examiner

METHOD AND CONFIGURATION TO REDUCE FATIGUE IN STEAM DRUMS

FIELD OF INVENTION

The subject matter disclosed herein relates generally to heat recovery steam generators having a high pressure steam drum. More particularly, the subject matter disclosed herein relates to a system having multiple steam drums operated at equal pressures.

BACKGROUND

Heat recovery steam generators (HRSG) are used to recover heat contained in the exhaust gas stream of a gas turbine or similar source and convert water to steam. In order to optimize the overall plant efficiency, the HRSG includes one or more steam generating circuits which operate at selected pressures.

Natural and assisted circulation boilers utilize a steam drum operating at high pressure in which the steam is separated from the water. The steam drum should be of sufficient volume to allow for changes in water level in the drum due to changes in fluid density and operating conditions. Since the length of the drum is often limited by space constraints, the needed volume is obtained by increasing the inside diameter of the drum. However, to maintain acceptable stress levels on the drum walls, the thickness of the drum wall must be increased when the inner diameter is increased.

Increased drum wall thickness increases the through wall temperature gradient at boiler start-up since it takes a longer amount of time to heat through a thicker wall. This increase in through wall temperature gradient results in increased thermal stress on the steam drum wall, which may, in turn, cause wear of the steam drum wall in the form of cracking. Cracking of the steam drum wall necessitates maintenance or repair which causes plant shut-down and added expense.

The configuration and methods of operation described herein are seen to reduce or eliminate the above mentioned deficiencies that may be found in current systems.

SUMMARY

According to aspects described herein, there is provided a heat recovery steam generator comprising: a first steam drum for receiving a flow of water and steam from an evaporator, the first steam drum adapted to provide the flow of water and steam to a second steam drum; the second steam drum in fluid communication with the first steam drum, the second steam drum for receiving the flow of water and steam from the first steam drum and separating steam from the flow of water and steam to form a separated steam; and a steam flow outlet positioned in the second steam drum, the steam flow outlet adapted to release the separated steam from the second steam drum.

In other aspects described herein, there is provided a heat recovery steam generator comprising: a first steam drum having an inner diameter and a wall thickness, the first steam drum adapted to receive a first flow of water and steam from an evaporator to generate a first flow of steam; and a second steam drum having an inner diameter and a wall thickness, the second steam drum adapted to receive a second flow of water and steam from the evaporator to generate a second flow of steam; wherein the first steam drum and the second steam drum are operated at equal pressures.

In other aspects described herein, there is provided a method of generating steam in a heat recovery steam generator, the method comprising: providing a first flow of water and steam from an evaporator to a first steam drum; providing a second flow of water and steam from the first steam drum to a second steam drum; and separating steam from the flow of water and steam in the second drum to generate a flow of steam, wherein a first pressure of the first steam drum is equal to a second pressure of the second steam drum.

In other aspects described herein, there is provided a method of generating steam in a heat recovery steam generator, the method comprising: providing a first flow of water and steam from an evaporator to a first steam drum to separate steam from the first flow of water and steam to generate a first steam flow; and providing a second flow of water from an evaporator to a second steam drum to separate steam from the second flow of water and steam to generate a second steam flow; wherein a first pressure of the first steam drum is equal to a second pressure of the second steam drum.

The above described systems and methods, and other features are exemplified by the following figures and detailed description.

DETAILED DESCRIPTION

Figure 1:
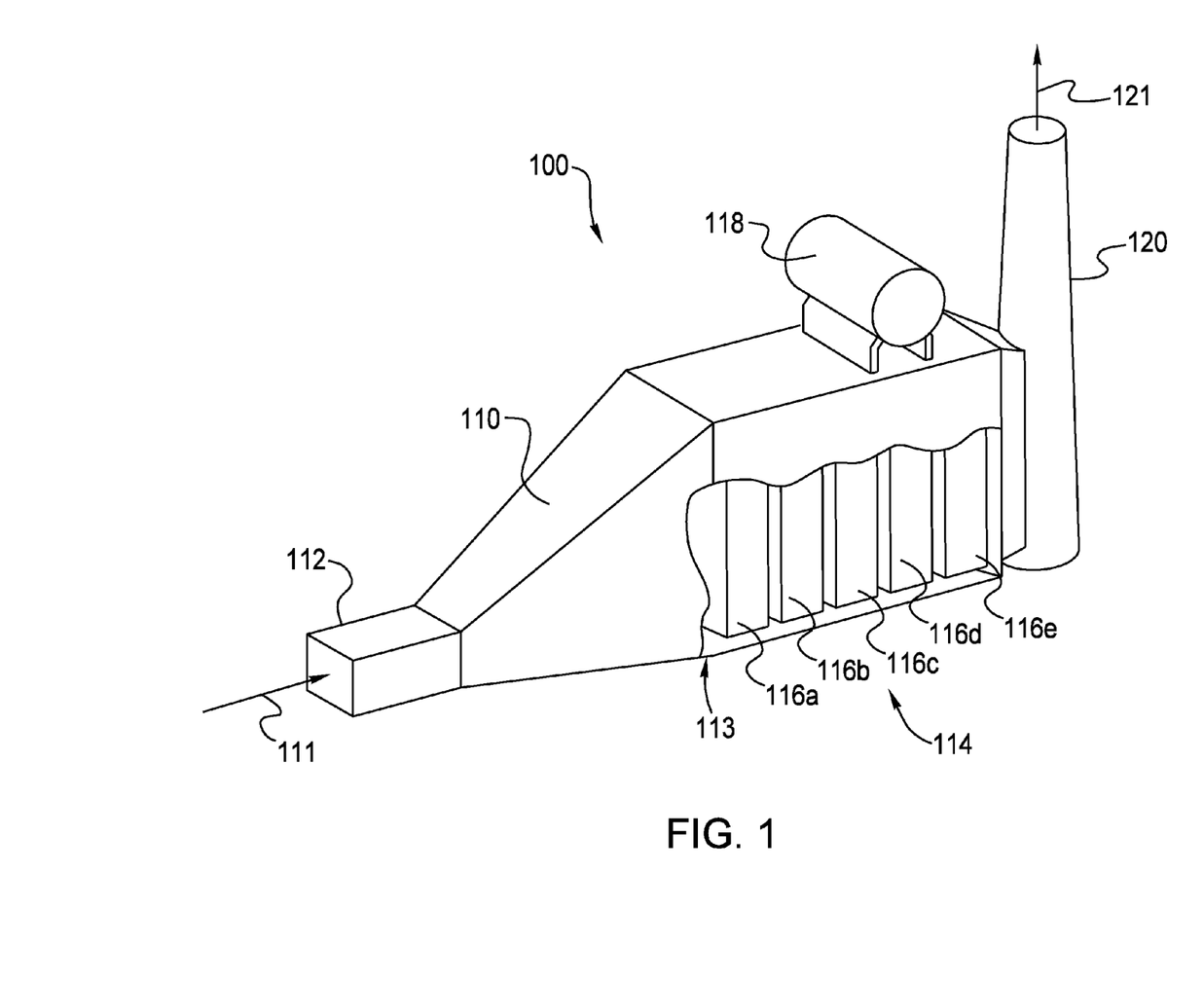
FIG. 1 is a general perspective view of a horizontal heat recovery steam generator.

As shown in FIG. 1, a heat recovery steam generator (HRSG) generally designated by the reference numeral 100 is of the horizontal type, but the system and methods described herein may be equally applicable to units with vertical gas flow.

The HRSG 100 generates steam by capturing and utilizing heat contained in an exhaust gas generated by a gas turbine. The generated steam may then be used to drive an electric generator with a steam turbine or may be used as process steam.

The HRSG 100 includes an expanding inlet transition duct 110 where a gas flow 111 is expanded from the inlet duct 112 to a full cross section 113 of the HRSG containing a heat transfer surface 114. The heat transfer surface 114 includes various tube banks 116*a*-116*e* that transfer heat from the gas flow 111 to a medium, such as water, contained therein. The various tube banks 116*a*-116*e* of the heat transfer surface 114 may include, for example, a low pressure economizer, a low pressure evaporator, a high pressure evaporator and a high pressure superheater, generation tubes, and downcomer tubes. Also shown in FIG. 1 are a steam drum 118 and a stack 120.

Heat present in the gas flow 111 is transferred from the gas flow to the heat transfer surface 116. The transfer of heat generates a combination of hot water and steam that is provided to the steam drum 118, which separates the steam from the water. The steam may be used in further processes, such as, for example, the generation of electricity. In the meantime, the gas flow 111 has cooled to form a cooled gas flow 121, which is released to an environment via the stack 120. While not shown in FIG. 1, it is contemplated that the cooled gas flow 121 may undergo further processing, e.g., contaminant removal, prior to being released to the environment via the stack 120.

As shown in FIG. 1, the HRSG 100 includes a single steam drum 118. However, it is contemplated that the HRSG 100 includes more than one steam drum 118, each of which operate at a different pressure to generate steam. For example, the HRSG 100 may include a high pressure steam drum, an intermediate pressure steam drum, and a low pressure steam drum, or any combinations thereof. The operating pressures of high, intermediate and low pressure drums vary from system to system and the parameters implemented therein.

Figure 2:
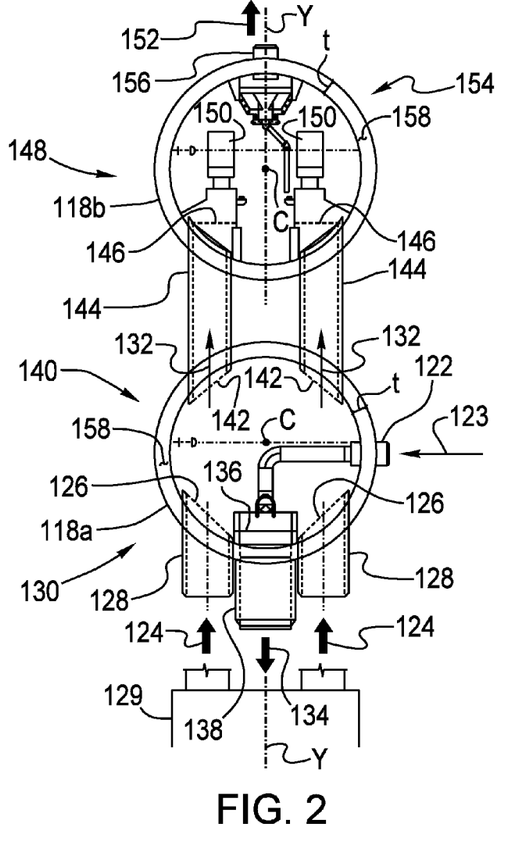
FIG. 2 is a cross-sectional view of multiple steam drums in a vertical arrangement.

In one embodiment, as shown in FIG. 2, the HRSG 100 includes two steam drums; a first steam drum 118a, and a second steam drum 118b. Both the first steam drum 118a and the second steam drum 118b are operated at equal pressures. Accordingly, the steam drums 118a, 118b may both be high pressure steam drums, intermediate pressure steam drums, or low pressure steam drums. In one embodiment, both the first steam drum 118a and the second steam drum 118b are high pressure steam drums. The specific pressures at which the first steam drum 118a and the second steam drum 118b are operated at will depend on the system in which they are employed.

The first steam drum 118a has a feedwater nozzle 122 that fluidly connects the first steam drum 118a to a water source (not shown). A flow of water 123 is provided to the first steam drum 118a via the feed water nozzle 122 to make up for the water that is evaporated in the evaporator.

An additional flow of water and steam 124 is provided to the first steam drum 118a via at least one flow inlet 126. The flow of water and steam 124 is provided to the first steam drum 118a via a group of generation tubes, which permits generation of the steam by exchanging heat with the gas flow 111 (shown in FIG. 1). The generation tubes may be grouped and connected to the first steam drum 118a by a riser 128.

FIG. 2 illustrates two flow inlets 126, however it is contemplated that the first steam drum 118a may have more or less flow inlets than shown. The number of flow inlets 126 in the first steam drum 118a is determined by the number of risers 128 that are in fluid communication with the first steam drum and connect the first steam drum to an evaporator 129.

As shown in FIG. 2, the flow inlets 126 are positioned in a bottom portion 130 of the first steam drum 118a. The flow of water and steam 124 enters the first steam drum 118a and combines with water 123 provided to the first steam drum provided through water nozzle 122. The first steam drum 118a is adapted to utilize the water 123 to replace the steam that exits the drum and to provide the water and steam to the second steam drum 118b as a flow of water and steam 132.

The water in the first steam drum 118a that is more dense than the flow of water and steam 132 and exits the first steam drum as a flow of water 134 via an outlet 136 connected to a downcomer tube 138.

The flow of water and steam 132 rises to a top portion 140 of the first steam drum 118a and exits the first steam drum through at least one outlet 142. As shown in FIG. 2, the first steam drum 118a includes two outlets 142 that facilitate fluid communication of the first steam drum 118a with the second steam drum 118b. While two outlets 142 are illustrated in FIG. 2, it is contemplated that more or less outlets 142 may be utilized in the first steam drum 118a.

The flow of water and steam 132 is provided to the second steam drum 118b via one or more connection lines 144. As shown in FIG. 2, there are two connection lines 144 that fluidly connect the first steam drum 118a with the second steam drum 118b. However, it is contemplated that more or less connection lines 144 can be utilized to connect the two steam drums 118a, 118b.

Still referring to FIG. 2, the first steam drum 118a and the second steam drum 118b are arranged on a vertical axis with the second steam drum positioned on top of the first steam drum. As illustrated in FIG. 2, the center point C of each of the steam drums 118a and 118b are positioned on the Y axis. The vertical arrangement permits the flow of water and steam 124 to enter the bottom portion 130 of the first steam drum 118a and exit the first steam drum via at least one outlet 142 as the flow of water and steam 132. The flow of water and steam 132 rises to the top portion 140 of the first steam drum 118a and is provided to the second steam drum 118b via the at least one connection line 144.

While the steam drums 118a and 118b are illustrated as being positioned in a vertical manner along the Y axis, it is contemplated that the steam drums may be placed in any arrangement, including a horizontal arrangement, or any arrangement between a vertical arrangement and a horizontal arrangement.

After rising and exiting from the first steam drum 118a, the flow of water and steam 132 is provided to the second steam drum 118b, where the steam is separated from the water. The flow of water and steam 132 enters the second steam drum 118b via at least one flow inlet 146 positioned in a bottom portion 148 of the second steam drum.

A steam separator 150 is in fluid communication with the flow inlet 146. As shown in FIG. 2, the second steam drum 118b has two flow inlets 146 and two steam separators 150. However, it is contemplated that the second steam drum 118b may include more or less flow inlets 146 and steam separators 150, and such number may vary depending on the number of connection lines 144 from the first steam drum 118a.

In the second steam drum 118b, steam is separated from the flow of water and steam 132 to form a separated steam 152. The separated steam 152 rises to a top portion 154 of the second steam drum 118b and exits via a steam flow outlet 156. As illustrated in FIG. 2, the steam flow outlet 156 is positioned at the top portion 154 of the second steam drum 118b and is opposite of the position of the flow inlets 146. It is contemplated that a different arrangement and positioning of the steam flow outlet may be utilized.

Utilization of more than one steam drum that is operated at the same pressure allows a user to decrease a thickness t of a wall 158 of the steam drum while maintaining the pressure and a volume utilized in only one steam drum. By decreasing the wall thickness t of the steam drums utilized in the HRSG 100, the stress of heating through the wall 158 (referred to as "thermal stress") at boiler start up is reduced. Reduction of thermal stress on the wall 158 reduces or eliminates crack formation in the wall. Reduction or elimination of crack formation in the wall 158 allows more start up cycles and reduces plant shut down time required maintain or replace the steam drum.

As shown in FIG. 2, the first and second steam drums 118a, 118b have the same inner diameter D and the same wall thickness t. Variation in the inner diameters D and the wall thicknesses t of the first and second steam drums 118a, 118b is within the scope of this embodiment. However, it is contemplated that the inner diameter D and/or the wall thickness t of the first steam drum 118a may be greater or less than the inner wall diameter D and/or wall thickness t of the second steam drum 118b. Accordingly, in one embodiment, the inner diameter D of the first steam drum 118a is different than the inner diameter D of the second steam drum 118b while in another embodiment the wall thickness t of the first steam drum is different that the wall thickness t of the second steam drum.

It is contemplated that the inner diameters D of the first and second steam drums 118a, 118b is less than an inner diameter of a system employing a single drum having a volume that is similar to the total volume of the first and second steam drums 118a, 118b. Similarly, it is contemplated that the wall thicknesses t of the first and second steam drums 118a, 118b is less than a wall thickness of a system employing a single drum having a volume that is similar to the total volume of the first and second steam drums 118a, 118b.

The inner diameter D and the wall thickness t of the first and second steam drums 118a, 118b will vary between systems and the parameters e.g., pressure, volume, used therein. Standard single high pressure steam drums have inner diameters between about 1700 millimeter (mm) to about 2000 mm with wall thickness ranging between about 80 mm to about 125 mm. In one example, the volume of a single steam drum can be maintained by utilizing two steam drums, e.g., first and second steam drums 118a, 118b, and reducing the diameters and wall thickness by about one half (0.50) to about three quarters (0.75) of the values of the single drum. In one embodiment, the volume of a single steam drum can be maintained by utilizing two steam drums, e.g., first and second steam drums 118a, 118b, and reducing the diameters and wall thicknesses to 0.707 of the values for the single drum. Accordingly, two steam drums can be made utilizing approximately the same amount of material utilized to make a single steam drum.

Figure 3:
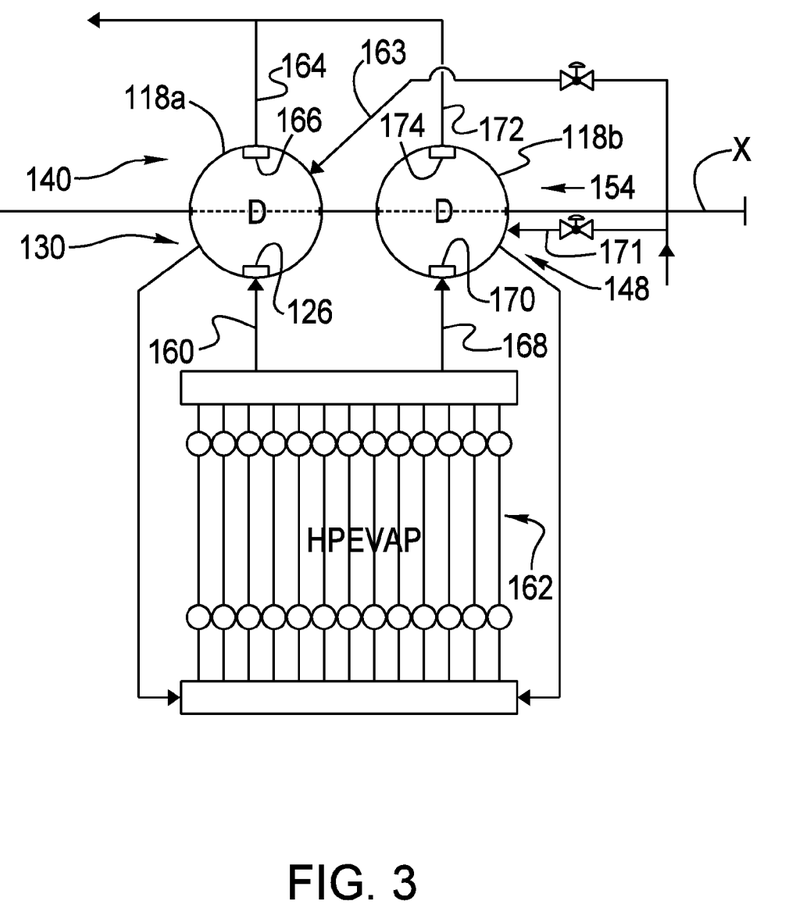
FIG. 3 is a cross sectional view of multiple steam drums in a horizontal arrangement.

Now referring to FIG. 3, the steam drums utilized in the HRSG 100 may include at least two steam drums that are operated at the same pressure. FIG. 3 illustrates two steam drums, a first steam drum 118a and a second steam drum 118b. The first steam drum 118a is operated at a pressure equal to a pressure at which the second steam drum 118b is operated at. Accordingly, the steam drums 118a, 118b may both be high pressure steam drums, intermediate pressure steam drums, or low pressure steam drums. In one embodiment, both the first steam drum 118a and the second steam drum 118b are high pressure steam drums.

As described in detail below, the steam drums shown in FIG. 3 each independently separate steam to form separate and independent flows of steam. As such, the HRSG 100 can be adapted to include more than two steam drums 118 to generate more steam.

Still referring to FIG. 3, the first steam drum 118a adapted to receive a first flow of water and steam 160 from an evaporator 162. The first flow of water and steam 160 enters the first steam drum 118a through a flow inlet 126 and is combined with water present in the first steam drum provided via a water line 163. As shown in FIG. 3, the flow inlet 126 is positioned in the bottom portion 130 of the first steam drum 118a. It is contemplated that the first steam drum 118a has more than one flow inlet 126. Similar to FIG. 2, the first flow of water and steam 160 from the evaporator 162 may be provided to the first steam drum 118a via a riser 128.

The first steam drum 118a separates steam from the flow of water and steam to generate a first flow of steam 164. The first flow of steam 164 exits the first steam drum 118a through a steam flow outlet 166. As shown in FIG. 3, the steam flow outlet 166 is positioned opposite of the flow inlet 126 in the top portion 140 of the first steam drum 118a.

As shown in FIG. 3, the steam drums utilized in the HRSG 100 also includes a second steam drum 118b. The second steam drum 118b is adapted to receive a second flow of water 168 and steam from the evaporator 162. The second flow of water and steam 168 enters the second steam drum 118b through a flow inlet 170 and is combined with water provided by a water line 171. A shown in FIG. 3, the flow inlet 170 is positioned in the bottom portion 148 of the second steam drum 118b.

While not shown in FIG. 3, it is contemplated that the second steam drum 118b includes more than one flow inlet 170. The second flow of water and steam 168 is provided to the second steam drum 118d via a riser 128.

The second steam drum 118b separates steam from the flow of water and steam 168 to generate a second flow of steam 172. The second flow of steam 172 exits the second steam drum 118b via a second steam flow outlet 174. As shown in FIG. 3, the second steam flow outlet 174 is positioned opposite of the flow inlet 170 in the top portion 154 of the second steam drum 118b.

The first and second steam drums 118a, 118b in the configuration shown in FIG. 3 have the same inner diameter D and the same wall thickness t. Variation in the inner diameters D and the wall thicknesses t of the first and second steam drums 118a, 118b is within the scope of this embodiment. However, it is contemplated that the inner diameter D and/or the wall thickness t of the first steam drum 118a may be greater of less than the inner wall diameter D and/or wall thickness t of the second steam drum 118b. Accordingly, in one embodiment, the inner diameter D of the first steam drum 118a is different than the inner diameter D of the second steam drum 118b while in another embodiment the wall thickness t of the first steam drum is different than the wall thickness t of the second steam drum.

It is contemplated that the inner diameters D of the steam drums employed in an embodiment illustrated in FIG. 3, e.g., first and second steam drums 118a, 118b, and any additional steam drums, is less than an inner diameter of a system employing a single drum having a volume that is similar to the total volume of the first and second steam drums 118a, 118b. Similarly, it is contemplated that the wall thicknesses t of steam drums employed in an embodiment illustrated in FIG. 3, e.g., the first and second steam drums 118a, 118b, and any additional steam drums, is less than a wall thickness of a system employing a single drum having a volume that is similar to the total volume of the first and second steam drums 118a, 118b.

The inner diameter D and the wall thickness t of the first and second steam drums 118a, 118b will vary between systems and the parameters e.g., pressure, volume, used therein. Standard single high pressure steam drums have inner diameters between about 1700 millimeter (mm) to about 2000 mm with wall thickness ranging between about 80 mm to about 125 mm. In one example, the volume of a single steam drum can be maintained by utilizing two steam drums, e.g., first and second steam drums 118a, 118b, and reducing the diameters and wall thickness by about one half (0.50) to about three quarters (0.75) of the values of the single drum. In one embodiment, the volume of a single steam drum can be maintained by utilizing two steam drums, e.g., first and second steam drums 118a, 118b, and reducing the diameters and wall thicknesses to 0.707 of the values for the single drum. Accordingly, two steam drums can be made utilizing approximately the same amount of material utilized to make a single steam drum.

The first and second steam drums 118a, 118b shown in FIG. 3 are arranged along a horizontal axis X and operate separately and independently of one another. Additional steam drums that are added to the HRSG 100 would also be arranged along the horizontal axis X.

While the steam drums 118a and 118b are illustrated as being positioned in a horizontal manner along the X axis, it is contemplated that the steam drums may be placed in any arrangement, including a vertical arrangement, or any arrangement between a vertical arrangement and a horizontal arrangement.

As shown in FIG. 3, the second flow of steam 172 combines with the first flow of steam 164. However, it is contemplated that the first and second flows of steam 164, 172 may not be combined. The flows of steam 164, 172 may be utilized elsewhere in the HRSG 100.

Figure 4:
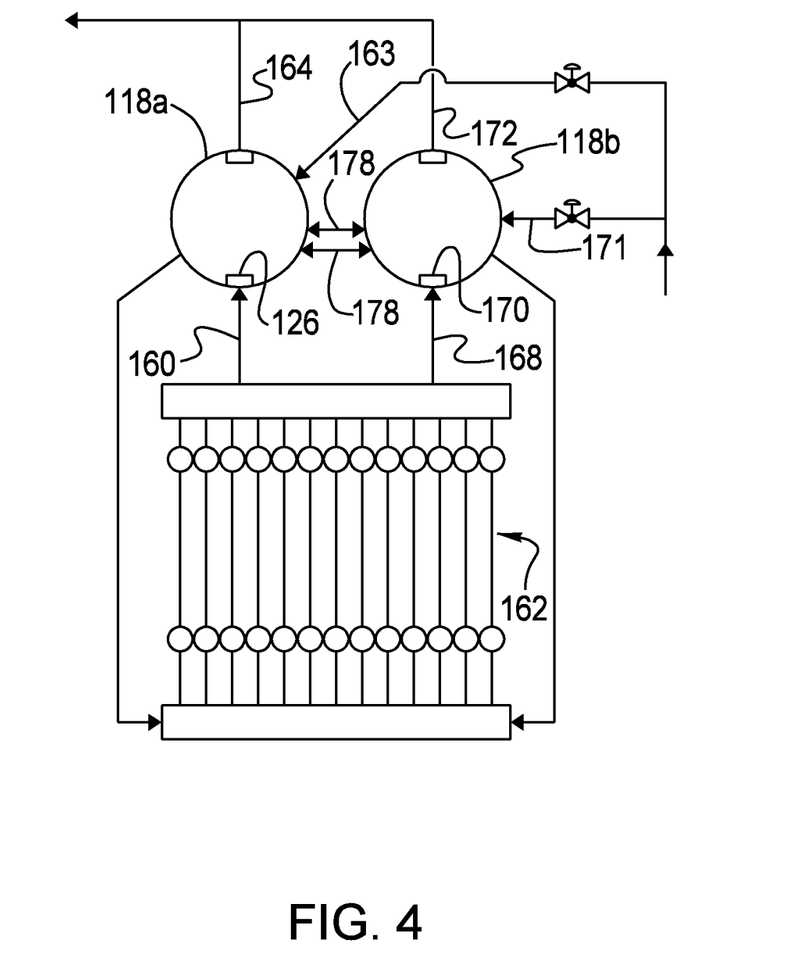
FIG. 4 is a cross sectional view of multiple steam drums in a horizontal arrangement.

Now referring to FIG. 4, in one embodiment, the first steam drum 118a is in fluid communication with the second steam drum 118b via at least one connection line 178. The connection line(s) 178 facilitate a flow of water between the first and second steam drums 118a, 118b so that the volume of water in both drums is available to one another to maintain the same level of water in each drum. If additional water is needed in either the first or second steam drum 118a, 118b, it can be added via the water lines 163, 171.

It is contemplated that a third steam drum (not shown) may be fluidly connected to the second steam drum 118b via a connection line 178. Additional steam drums, e.g., fourth and fifth steam drums, etc., may be added to the HRSG 100 of FIG. 4.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A heat recovery steam generator comprising:
   a plurality of generation tubes having water passing therethrough to generate steam and water by exchanging heat with a gas flow passing through the heat recovery steam generator;
   a riser fluidly connected to the plurality of generation tubes to collect the steam and water passing through the plurality of generation tubes;
   a first steam drum for receiving the collected water and steam from the riser, the first steam drum defining a first inlet and a first outlet, the first inlet positioned in a bottom portion of the first steam drum, the first outlet disposed at a too portion of the first steam drum, the riser coupled to the first inlet;
   a second steam drum for receiving a portion of the water and steam directly from the first steam drum, the second steam drum defining a second inlet positioned in a bottom portion of the second steam drum;
   a connection line fluidly coupling the first outlet with the second inlet for carrying the water and steam exiting the first steam drum to the second steam drum;
   a steam separator disposed within the second steam drum being in fluid communication with the second inlet, the steam separator configured to separate steam from the received water and steam to form a separated steam; and
   a steam flow outlet positioned in the second steam drum, the steam flow outlet adapted to release the separated steam from the second steam drum.

2. A heat recovery steam generator of claim 1, wherein the first steam drum and the second steam drum are operated at equal pressures.

3. A heat recovery steam generator of claim 1, wherein the first steam drum and the second steam drum are arranged on a vertical axis with the second steam drum positioned on top of the first steam drum.

4. A heat recovery steam generator according to claim 1, wherein the first steam drum further defines a water outlet connected to a downcomer tube for allowing water to exit the first steam drum.

5. A heat recovery steam generator according to claim 1, wherein the first steam drum has an inner diameter and a wall thickness, and an inner diameter of the second steam drum is equal to the inner diameter of the first steam drum.

6. A heat recovery steam generator according to claim 1, wherein the first steam drum has an inner diameter and a wall thickness, and a wall thickness of the second steam drum is equal to the wall thickness of the first steam drum.

7. The heat recovery steam generator of claim 1, wherein substantially all the water and gas provided to the first drum passes to the second steam drum.

8. The heat recovery steam generator of claim 1, wherein substantially all the gas provided to the first steam drum exits the second steam drum.

9. A method of generating steam in a heat recovery steam generator, the method comprising:
   heating water passing through a plurality of generation tubes by a gas flow to generate steam and water;
   collecting the steam and water passing through the plurality of generation tubes;
   providing the collected water and steam via a first riser to a first steam drum, the first riser coupled to the first steam drum at a lower portion thereof;
   providing the collected water and steam from the first steam drum directly to a second steam drum at a lower portion of the second steam drum,
   aligning the second steam drum vertically above the first steam drum; and
   separating steam from the collected water and steam in the second drum to generate a flow of steam; and
   releasing the separated steam from a steam outlet of the second steam drum.

10. A method according to claim 9, wherein the inner diameter of the first steam drum is equal to the inner diameter of the second steam drum and the wall thickness of the first steam drum is equal to the wall thickness of the second steam drum.

11. The heat recovery steam generator of claim 9, wherein substantially all the water and gas provided to the first drum passes to the second steam drum.

12. The heat recovery steam generator of claim 9, wherein substantially all the gas provided to the first steam drum exits the second steam drum.

* * * * *

UNITED STATES PATENT AND TRADEMARK OFFICE
CERTIFICATE OF CORRECTION

PATENT NO. : 9,518,731 B2
APPLICATION NO. : 13/069528
DATED : December 13, 2016
INVENTOR(S) : Bairley et al.

It is certified that error appears in the above-identified patent and that said Letters Patent is hereby corrected as shown below:

In the Specification

In Column 2, Line 62, delete "heat transfer surface 116." and insert -- heat transfer surface 114. --, therefor.

In the Claims

In Column 7, Line 57, in Claim 1, delete "too" and insert -- top --, therefor.

In Column 8, Line 10, in Claim 2, delete "A heat" and insert -- The heat --, therefor.

In Column 8, Line 13, in Claim 3, delete "A heat" and insert -- The heat --, therefor.

In Column 8, Line 17, in Claim 4, delete "A heat" and insert -- The heat --, therefor.

In Column 8, Line 21, in Claim 5, delete "A heat" and insert -- The heat --, therefor.

In Column 8, Line 25, in Claim 6, delete "A heat" and insert -- The heat --, therefor.

In Column 8, Line 30, in Claim 7, delete "first drum" and insert -- first steam drum --, therefor.

In Column 8, Line 46, in Claim 9, delete "drum," and insert -- drum; --, therefor.

In Column 8, Line 53, in Claim 10, delete "A method" and insert -- The method --, therefor.

In Column 8, Line 58, in Claim 11, delete "The heat recovery steam generator" and insert -- The method --, therefor.

In Column 8, Line 59, in Claim 11, delete "first drum" and insert -- first steam drum --, therefor.

Signed and Sealed this
Twenty-eighth Day of February, 2017

Michelle K. Lee
*Director of the United States Patent and Trademark Office*

CERTIFICATE OF CORRECTION (continued)
U.S. Pat. No. 9,518,731 B2

In Column 8, Line 61, in Claim 12, delete "The heat recovery steam generator" and insert -- The method --, therefor.